(12) United States Patent
Takeuchi et al.

(10) Patent No.: US 7,655,356 B2
(45) Date of Patent: Feb. 2, 2010

(54) NONAQUEOUS ELECTROLYTE SECONDARY BATTERY

(75) Inventors: Masanobu Takeuchi, Kobe (JP); Seiji Yoshimura, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 657 days.

(21) Appl. No.: 11/385,656

(22) Filed: Mar. 22, 2006

(65) Prior Publication Data

US 2006/0216607 A1  Sep. 28, 2006

(30) Foreign Application Priority Data

Mar. 23, 2005  (JP) .............................. 2005-083202

(51) Int. Cl.
*H01M 4/58* (2006.01)
*H01M 10/40* (2006.01)

(52) U.S. Cl. .................... 429/218.1; 429/215; 429/217; 429/231; 429/231.5; 429/232

(58) Field of Classification Search .............. 429/231.5, 429/231

See application file for complete search history.

(56) References Cited

U.S. PATENT DOCUMENTS

| | | | | |
|---|---|---|---|---|
| 5,744,264 | A * | 4/1998 | Barker | 429/223 |
| 6,632,565 | B2 * | 10/2003 | Nemoto | 429/218.1 |
| 6,730,404 | B1 * | 5/2004 | Suzuki et al. | 428/421 |
| 2004/0248010 | A1 * | 12/2004 | Kato et al. | 429/231.8 |

FOREIGN PATENT DOCUMENTS

| | | | |
|---|---|---|---|
| JP | 02-298531 | * | 12/1990 |
| JP | 10-162811 | A | 6/1998 |
| JP | 2000-243454 | * | 8/2000 |
| JP | 2000-243454 | A | 9/2000 |
| JP | 2001-196060 | * | 7/2001 |

OTHER PUBLICATIONS

Basini et al.,"Selection Criteria for Chosing Carbonaceous Matrix for HTR Block Type Design", 3rd International Topical Meeting on High Temperature Reactor Technology Oct. 1-4, 2006, Johannesburg, South Africa.*
Endo et al., "Vapor-grown carbon fibers (VGCFs) Basic properties and their battery applications", Carbon 39 (2001) 1287-1297.*
Cuesta et al.,"Comparative performance of X-ray diffraction and Raman microprobe techniques for the study of carbon materials", J. Mater. Chem., 1998, 8, 2875-2879.*

* cited by examiner

*Primary Examiner*—Patrick Ryan
*Assistant Examiner*—Ladan Mohaddes
(74) *Attorney, Agent, or Firm*—Kubovcik & Kubovcik

(57) ABSTRACT

A non-aqueous electrolyte secondary battery includes a positive electrode (1) containing lithium cobalt oxide as a positive electrode active material, a negative electrode (2) containing molybdenum dioxide as a negative electrode active material, and a non-aqueous electrolyte. The mass ratio of the negative electrode active material to the positive electrode active material is within the range of from 0.725 to 0.480. The conductive agent of the negative electrode consists of a carbon material having a lattice constant $C_0$ along a stacking direction of from 6.7 Å to 6.8 Å, as determined by X-ray diffraction, or the negative electrode contains no conductive agent made of carbon material.

2 Claims, 1 Drawing Sheet

NONAQUEOUS ELECTROLYTE SECONDARY BATTERY

BACKGROUND OF THE INVENTION

1. Field of the Invention

The present invention relates to non-aqueous electrolyte secondary batteries. More particularly, the invention relates to a non-aqueous electrolyte secondary battery comprising a positive electrode employing lithium cobalt oxide as the positive electrode active material, a negative electrode employing molybdenum dioxide as the negative electrode active material, and a non-aqueous electrolyte, and the non-aqueous electrolyte secondary battery is characterized in that it is capable of preventing the battery performance from degrading and of obtaining a sufficient battery capacity even when the battery is continuously charged with a very small current while being kept at a constant voltage for a long period of time.

2. Description of Related Art

In recent years, a non-aqueous electrolyte secondary battery, which employs a non-aqueous electrolyte solution and has a high electromotive force, has been widely used as a new type of secondary battery that achieves high power and high energy density.

This type of non-aqueous electrolyte secondary battery has been used as a power source for backing up memory data in mobile devices, in addition to use in a primary power source of mobile devices. In recent years, power sources for memory backup have been demanded to have higher energy densities as primary power sources in mobile devices tend to have higher energy densities.

The positive electrode active materials commonly used for non-aqueous electrolyte secondary batteries are lithium-transition metal composite oxides such as lithium cobalt oxide, lithium nickel oxide, and lithium manganese oxide having a spinel structure. The negative electrode active materials commonly used therefor include lithium metal, lithium alloys, carbon materials capable of intercalating and deintercalating lithium ions, lithium titanium oxides, and molybdenum oxides.

In recent years, a non-aqueous electrolyte secondary battery of the type described above has been proposed, which employs $LiCoO_2$ or $LiNiO_2$ as the positive electrode active material, and molybdenum oxide or iron sulfide as the negative electrode active material to prevent considerable deterioration in battery performance because of the heat used in reflow soldering (see Japanese Published Unexamined Patent Application No. 2000-243454, for example).

When the above-described non-aqueous electrolyte secondary battery is used as a power source for memory backup with a working voltage of about 3.0 V, it is necessary that the battery be charged with a very small current of about 1 μA to 5 μA while being kept at a constant voltage of about 3.0 V for a long period of time.

In the non-aqueous electrolyte secondary battery used as a power source for memory backup with a working voltage of about 3.0 V, a problem with using lithium manganese oxide having a spinel structure as the positive electrode active material is that because of its low specific capacity, the battery capacity cannot be high, and the storage performance is also poor. A problem with using $LiCO_{1/3}N_{1/3}Mn_{1/3}O_2$, $LiNiO_2$, and the like as the positive electrode active material is that the working voltage becomes lower than that obtained with lithium cobalt oxide $LiCoO_2$, so a sufficient capacity cannot be obtained when the battery is used with a working voltage of about 3.0 V.

In the case that the non-aqueous electrolyte secondary battery employing lithium cobalt oxide $LiCoO_2$ as the positive electrode active material is used as a power source for memory backup with a working voltage of about 3.0 V, it is possible to use lithium titanium oxide $Li_4Ti_5O_{12}$ or a molybdenum oxide, such as $MoO_{2.5}$ and molybdenum dioxide $MoO_2$, as the negative electrode active material.

A problem with using $Li_4Ti_5O_{12}$ as the negative electrode active material is that the filling density is poorer than the molybdenum oxides, and a high battery capacity will not be attained. A problem with using a molybdenum oxide having a high oxidation number such as $MoO_{2.5}$ is that the working voltage becomes higher than when using molybdenum dioxide $MoO_2$, so that a sufficient capacity cannot be obtained.

For these reasons, in order to obtain a sufficient capacity when using a non-aqueous electrolyte secondary battery as a power source for memory backup with a working voltage of about 3.0 V, it is believed preferable that the positive electrode active material be lithium cobalt oxide $LiCoO_2$ and the negative electrode active material be molybdenum dioxide $MoO_2$.

Nevertheless, when the non-aqueous electrolyte secondary battery employing lithium cobalt oxide $LiCoO_2$ as the positive electrode active material and molybdenum dioxide $MoO_2$ as the negative electrode active material is used as a power source for memory backup with a working voltage of about 3.0 V, the battery performance considerably degrades.

The reason is as follows. In the case that a non-aqueous electrolyte secondary battery that has a positive electrode employing lithium cobalt oxide as the positive electrode active material and a negative electrode employing a carbon material as the negative electrode active material is used as the main power source of an ordinary portable device, the negative electrode is charged to about 0.1 V versus lithium metal during charge. Consequently, a surface film with good ionic conductivity forms on the surface of the carbon material of the negative electrode. This surface film keeps the negative electrode and the non-aqueous electrolyte solution from reacting with each other, making it possible to prevent decomposition of the non-aqueous electrolyte solution and destruction of the structure of the negative electrode.

In contrast, when the non-aqueous electrolyte secondary battery is used as a power source for memory backup with a working voltage of about 3.0 V, the positive electrode active material, lithium cobalt oxide, cannot yield a sufficient specific capacity unless it is charged at 4.0 V or higher versus lithium metal, and if the potential of lithium cobalt oxide becomes 4.2 V or higher versus lithium metal, decomposition of the non-aqueous electrolyte solution becomes considerable at the positive electrode. For this reason, the negative electrode can be charged only to about 1.0 V versus lithium metal, and the surface film will not be formed on the negative electrode surface.

Generally, a carbon material such as carbon black is added to the negative electrode as a conductive agent in order to enhance the conductivity in the negative electrode. However, as described above, because the surface film with good ionic conductivity does not form on the negative electrode surface, the carbon material used as the conductive agent in the negative electrode reacts with the non-aqueous electrolyte solution, causing decomposition of the non-aqueous electrolyte solution and destruction of the structure of the negative electrode. Thus, the battery performance is degraded.

BRIEF SUMMARY OF THE INVENTION

Accordingly, it is an object of the present invention to resolve the foregoing and other issues in the non-aqueous electrolyte secondary battery that employs lithium cobalt oxide as the positive electrode active material and molybdenum dioxide as the negative electrode active material. That is, it is an object of the present invention to prevent degradation in battery performance of a non-aqueous electrolyte secondary battery and obtain a sufficient battery capacity when the non-aqueous electrolyte secondary battery is continuously charged with a very small current while being kept at a constant voltage of about 3.0 V for a long period of time, so that the non-aqueous electrolyte secondary battery can be suitably used as an about 3.0 V power source for memory backup.

In order to accomplish the foregoing object, the present invention provides, in accordance with a first aspect, a non-aqueous electrolyte secondary battery comprising: a positive electrode containing lithium cobalt oxide as a positive electrode active material; a negative electrode containing a conductive agent and molybdenum dioxide as a negative electrode active material; and a non-aqueous electrolyte, wherein the mass ratio of the negative electrode active material to the positive electrode active material is within the range of from 0.725 to 0.480; and the conductive agent of the negative electrode consists of a carbon material having a lattice constant $C_0$ along a stacking direction of from 6.7 Å to 6.8 Å, as determined by X-ray diffraction.

In order to accomplish the foregoing object, the present invention also provides, in accordance with a second aspect, a non-aqueous electrolyte secondary battery comprising: a positive electrode containing lithium cobalt oxide as a positive electrode active material; a negative electrode containing a conductive agent and molybdenum dioxide as a negative electrode active material; and a non-aqueous electrolyte, wherein the mass ratio of the negative electrode active material to the positive electrode active material is within the range of from 0.725 to 0.480; and the negative electrode contains no conductive agent made of carbon material.

By setting the mass ratio of the negative electrode active material to the positive electrode active material within the range of from 0.725 to 0.480 in the case that the positive electrode active material contains lithium cobalt oxide and the negative electrode active material contains molybdenum dioxide, as in the non-aqueous electrolyte secondary battery of the present invention, the following advantages are achieved. When the battery is charged while being kept at a constant voltage of about 3.0 V, the end-of-charge voltage in the positive electrode is prevented from becoming too high, and the destruction of the structure of the positive electrode due to change in the quality of the positive electrode active material and the decomposition of the non-aqueous electrolyte solution due to the reaction between the positive electrode and the non-aqueous electrolyte solution are precluded. Moreover, a sufficient battery capacity can be obtained.

Moreover, the following advantages are achieved by using as the conductive agent of the negative electrode only a carbon material having a lattice constant $C_0$ along a stacking direction of from 6.7 Å to 6.8 Å, as determined by X-ray diffraction, in the non-aqueous electrolyte secondary battery according to the first aspect of the present invention. Because the lattice constant $C_0$ along the stacking direction of the carbon material is 6.8 Å or less, solvated lithium ions are prevented from entering the carbon material when the battery is charged while being kept at a constant voltage of about 3.0 V. Thus, the side reaction that causes decomposition of the solvent in the negative electrode is prevented from occurring, and the structure of the negative electrode is prevented from being destroyed. The reason why the lattice constant $C_0$ is restricted to be 6.7 Å or greater is that the lattice constant $C_0$ is theoretically 6.7 Å or greater.

Furthermore, when no conductive agent made of carbon material is added to the negative electrode, as in the non-aqueous electrolyte secondary battery according to the second aspect of the present invention, solvated lithium ions do not enter the carbon material, making it possible to prevent the side reaction that causes decomposition of the solvent at the negative electrode and to prevent the structure of the negative electrode from being destroyed. In addition, sufficient battery performance is achieved without particularly adding a conductive agent, because molybdenum dioxide, used for the negative electrode active material in the non-aqueous electrolyte secondary battery of the present invention, has good electron conductivity.

Consequently, the battery performance is prevented from degrading in the non-aqueous electrolyte secondary battery of the present invention even when the battery is charged with a very small current while being kept at a constant voltage of about 3.0 V for a long period of time, and the battery can be suitably used for a power source for memory backup with a working voltage of about 3.0 V.

DETAILED DESCRIPTION OF THE INVENTION

Figure 1:
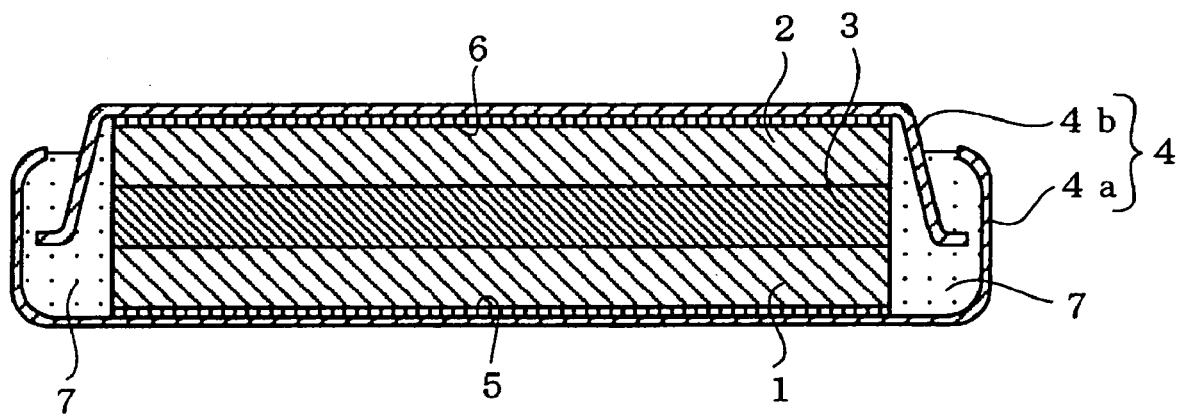
FIG. 1 is a schematic cross-sectional view illustrating a non-aqueous electrolyte secondary battery, fabricated in Examples and Comparative Examples of the present invention.

Hereinbelow, preferred embodiments of the non-aqueous electrolyte secondary battery according to the present invention will be described in detail. It should be construed that the non-aqueous electrolyte secondary battery of the present invention is not limited to those illustrated in the following embodiments and examples, but various changes and modifications may be made unless such changes and modifications depart from the scope of the invention.

In the non-aqueous electrolyte secondary battery of the present invention, lithium cobalt oxide used for the positive electrode active material in the positive electrode has specific initial charge capacities of about 165 mAh/g, about 145 mAh/g, about 130 mAh/g, and about 100 mAh/g, respectively at potentials of 4.3 V, 4.2 V, 4.1 V, and 4.0 V versus lithium metal.

In the case that the battery using lithium cobalt oxide as the positive electrode active material is continuously charged so as to keep a constant potential, a phase change occurs in the lithium cobalt oxide when the potential in the positive electrode becomes 4.2 V or higher versus lithium metal; thus, the structure of the positive electrode is destroyed, and the decomposition of the non-aqueous electrolyte solution becomes noticeable. For this reason, in the non-aqueous-electrolyte secondary battery of the present invention, it is necessary to control the positive electrode potential so as not to become 4.2 V or higher versus lithium metal by utilizing the potential drop of the negative electrode.

In the non-aqueous electrolyte secondary battery of the present invention, molybdenum dioxide used for the negative electrode active material in the negative electrode shows a potential of about 1.2 V versus lithium metal in the fully charged state, and its specific capacity is in the range of from about 200 mAh/g to 210 mAh/g. Accordingly, in order to control the positive electrode potential to be 4.2 V or less versus lithium metal by utilizing the potential drop of the negative electrode, it is necessary that the mass ratio of the negative electrode active material to the positive electrode active material be 0.725 or less. However, if the mass ratio of the negative electrode active material to the positive electrode active material becomes-too low, a sufficient battery capacity will not be obtained; therefore, it is necessary to control the mass ratio of the negative electrode active material to the positive electrode active material to be 0.480 or greater.

The non-aqueous electrolyte secondary battery of the present invention utilizes, as the conductive agent in the negative electrode, a carbon material having a lattice constant $C_0$ along a stacking direction of 6.7 Å to 6.8 Å, as determined by X-ray diffraction. It is preferable to use graphitized vapor grown carbon fiber as the just-mentioned carbon material, and furthermore, it is preferable to use a mixture of the graphitized vapor grown carbon fiber and another carbon material.

Here, although the reason is not clearly understood, it is believed that the use of graphitized vapor grown carbon fiber as the carbon material having a lattice constant $C_0$ along the stacking direction of from 6.7 Å to 6.8 Å, as determined by X-ray diffraction, achieves the following. The conductive agent containing the carbon fiber stabilizes the negative electrode in the charged state. Thereby, the reaction between the negative electrode and the non-aqueous electrolyte solution is impeded, so that the decomposition of the non-aqueous electrolyte solution and the destruction of the structure of the negative electrode can be prevented.

In addition, it is preferable that the graphitized-vapor grown carbon fiber have a ratio (La/Lc) of the crystallite size La along the a-axis to the crystallite size Lc along the c-axis within the range of from 4 to 6. The reason is as follows. If the ratio La/Lc is less than 4, a side reaction with the non-aqueous electrolyte solution tends to easily occur in the c-plane of the graphitized vapor grown carbon fiber, so that there is a risk of causing the decomposition of the non-aqueous electrolyte solution and the destruction of the structure of the negative electrode. On the other hand, if the ratio La/Lc exceeds 6, formability of the negative electrode becomes poor, and it is preferable that the ratio La/Lc be 5 or less.

In addition, it is preferable that the graphitized vapor grown carbon fiber have a specific surface area of from 10 m$^2$/g to 20 m$^2$/g. The reason is as follows. If the specific surface area is less than 10 m$^2$/g, a sufficient conductivity may not be obtained. On the other hand, if the specific surface area is greater than 20 m$^2$/g, the graphitized vapor grown carbon fiber may cause a reaction with the non-aqueous electrolyte solution.

The graphitized vapor grown carbon fiber is relatively hard and has elasticity. Therefore, when a negative electrode is fabricated using a conductive agent containing the graphitized vapor grown carbon fiber, the negative electrode becomes brittle and its strength reduces, leading to poor cycle life of the non-aqueous electrolyte secondary battery. For this reason, in addition to the graphitized vapor grown carbon fiber, it is desirable to add another carbon material other than the graphitized vapor grown carbon fiber, as mentioned above. It should be noted that, if the lattice constant $C_0$ along a stacking direction as determined by X-ray diffraction is greater than 6.8 Å with the carbon material other than the graphitized vapor grown carbon fiber as well, solvated lithium ions enter the carbon material, causing side reactions such as decomposition of the solvent and destruction of the structure of the carbon material. Therefore, it is necessary to use a carbon material having a lattice constant $C_0$ along a stacking direction of from 6.7 Å to 6.8 Å, as determined by X-ray diffraction, also for the carbon material other than the graphitized vapor grown carbon fiber.

Any known binder agent that has been commonly used may be employed when preparing the negative electrode using a negative electrode mixture containing the negative electrode active material made of molybdenum dioxide, the above-noted conductive agent, and a binder agent. In particular, in order to improve the cycle life of the non-aqueous electrolyte secondary battery by enhancing the strength of the negative electrode, it is preferable to use polyimide as the binder agent.

Furthermore, in the non-aqueous electrolyte secondary battery according to the present invention, any known non-aqueous solvent that has been conventionally used may be employed as the non-aqueous solvent for the non-aqueous electrolyte. Particularly preferable is a mixed solvent in which a cyclic carbonate and a chain carbonate are mixed. Examples of the cyclic carbonate include ethylene carbonate, propylene carbonate, butylene carbonate, and vinylene carbonate. Examples of the chain carbonate include dimethyl carbonate, methyl ethyl carbonate, and diethyl carbonate. Alternatively, as the non-aqueous solvent, it is possible to use γ-butyrolactone or a mixed solvent of γ-butyrolactone and a cyclic carbonate. Generally, a cyclic carbonate tends to decompose at a high potential. Therefore, it is preferable that the proportion of cyclic carbonate in the non-aqueous solvent be within the range of from 10 volume % to 50 volume %, or more preferably, within the range of from 10 volume % to 30 volume %. In particular, the use of ethylene carbonate as the cyclic carbonate is preferable because it improves the battery's storage performance.

In the non-aqueous electrolyte, any known solute that has conventionally been used may be employed as a solute to be dissolved in the just-noted non-aqueous solvent. Examples include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, which may be used either alone or in combination. The use of $LiPF_6$ as the solute enables a surface film originating from the decomposition of the $LiPF_6$ to form on the surface of the current collector made of aluminum, which is commonly used for the positive electrode, when the battery is charged at a high charge voltage, and makes it possible to prevent the aluminum current collector from being dissolved.

Next, examples of the non-aqueous electrolyte secondary battery according to the present invention are described in detail along with comparative examples, and it will be demonstrated that the examples of the non-aqueous electrolyte secondary battery are capable of not having their battery performance degraded and are capable of attaining sufficient battery capacity even when they are charged with a very small current while being kept at a constant voltage of about 3.0 V for a long period of time. It should be noted that the non-aqueous electrolyte secondary battery according to the present invention is not limited to those described in the following examples, and various changes and modifications are possible within the scope of the invention.

EXAMPLE 1

In Example 1, a flat, coin-shaped non-aqueous electrolyte secondary battery as illustrated in FIG. 1 was fabricated using a positive electrode, a negative electrode, and a non-aqueous electrolyte solution that were prepared in the following manner.

Preparation of Positive Electrode

The positive electrode was prepared as follows. $LiCoO_2$ was used as the positive electrode active material. In a N-methyl-pyrrolidone solution, 85 parts by mass of a powder of the $LiCoO_2$ having a surface area (BET) of 0.48 m$^2$/g and a median particle diameter ($D_{50}$) of 6.2 μm was mixed with 5 parts by mass of acetylene black and 5 parts by mass of artificial graphite having a specific surface area of 300 m²/g as conductive agents, and with 5 parts by mass of polyvinylidene fluoride as a binder agent. The mixture was dried, pulverized, and then classified by passing it through a mesh, to thus prepare a positive electrode mixture. Then, 25.53 mg of the positive electrode mixture thus prepared was pressure formed to prepare a positive electrode in a pellet form having a diameter of 4.16 mm and a thickness of 0.59 mm. The amount of $LiCoO_2$ in the positive electrode thus prepared was 21.70 mg.

Preparation of Negative Electrode

The negative electrode was prepared using molybdenum dioxide $MoO_2$ as a negative electrode active material, and graphitized vapor grown carbon fiber as a conductive agent. The physical properties of the graphitized vapor grown carbon fiber was analyzed using an X-ray diffraction analyzer RINT 2200 (made by Rigaku Corp.), and it was found that $C_0=6.80$ Å, La=900 Å, and Lc=200 Å.

Then, 92 parts by mass of a powder of the just-mentioned $MoO_2$ having a surface area (BET) of 0.40 m²/g and a median particle diameter ($D_{50}$) of 18.6 μm, 5 parts by mass of powder of the graphitized vapor grown carbon fiber, and 3 parts by mass of polyvinylidene fluoride as a binder agent were mixed together in a N-methyl-pyrrolidone solution. The mixture was then dried, pulverized, and classified by passing it through a mesh, to thus prepare a negative electrode mixture. Then, 17.10 mg of the negative electrode mixture thus prepared was pressure formed to prepare a negative electrode in a pellet form having a diameter of 4.16 mm and a thickness of 0.31 mm. The amount of $MoO_2$ in the negative electrode was 15.73 mg, and the mass ratio X of the negative electrode active material $MoO_2$ to the positive electrode active material $LiCoO_2$ was 0.725.

Preparation of Electrolyte Solution

The non-aqueous electrolyte solution was prepared as follows. Lithium hexafluorophosphate $LiPF_6$ as a solute was dissolved at a concentration of 1 mol/L into a mixed solvent of 3:7 volume ratio of ethylene carbonate, which is a cyclic carbonate, and diethyl carbonate, which is a chain carbonate.

Preparation of Battery

The battery was fabricated as follows. As illustrated in FIG. 1, the above-described non-aqueous electrolyte was impregnated in a separator 3 made of nonwoven polypropylene fabric, and the separator was interposed between the positive electrode 1 and the negative electrode 2, prepared in the above-described manner. These components were accommodated in a battery case 4, composed of a positive electrode can 4a and a negative electrode can 4b. The positive electrode 1 was connected to the positive electrode can 4a via a positive electrode current collector 5, while the negative electrode 2 was connected to the negative electrode can 4b via a negative electrode current collector 6. The positive electrode can 4a and the negative electrode can 4b were electrically insulated with an insulative packing 7 made of polypropylene. Thus, a flat, coin-shaped lithium secondary battery with a diameter of 6 mm and a thickness of 2.1 mm was obtained.

EXAMPLES 2 AND 3 AND COMPARATIVE EXAMPLES 1 AND 2

In Examples 2 and 3, and Comparative Examples 1 and 2, non-aqueous electrolyte secondary batteries of Examples 2, 3, and Comparative Examples 1, 2 were fabricated in the same manner as in Example 1, except that the mass ratio X of the negative electrode active material $MoO_2$ to the positive electrode active material $LiCoO_2$ was varied by varying the amount of the positive electrode mixture used for the positive electrode and the amount of the negative electrode mixture used for the negative electrode in Example 1 above.

In Example 2, the amount of $LiCoO_2$ was 22.15 mg and the amount of $MoO_2$ was 15.28 mg, so that the mass ratio X was 0.690. In Example 3, the amount of $LiCoO_2$ was 24.60 mg and the amount of $MoO_2$ was 11.80 mg, so that the mass ratio X was 0.480. In Comparative Example 1, the amount of $LiCoO_2$ was 21.00 mg and the amount of $MoO_2$ was 16.60 mg, so that the mass ratio X was 0.790. In Comparative Example 2, the amount of $LiCoO_2$ was 25.20 mg and the amount of $MoO_2$ was 11.10 mg, so that the mass ratio X was 0.440.

Then, the non-aqueous electrolyte secondary batteries of Examples 1 to 3 and Comparative Examples 1 and 2, prepared in the above-described manner, were charged at a constant current of 50 μA until the battery voltage reached 3.2 V, and thereafter subjected to initial charging at a constant voltage of 3.2 V until the current lowered to 5 μA. Thereafter, the batteries were discharged at a current of 50 μA until the battery voltage became 2.0 V, to measure initial discharge capacity Qo. The results are shown in Table 1 below.

In addition, the non-aqueous electrolyte secondary batteries of Examples 1 to 3 and Comparative Examples 1 and 2 were charged at a constant current of 50 μA at room temperature until the battery voltage reached 3.2 V, and thereafter, they were consecutively charged at a constant voltage of 3.2 V for 30 days in an atmosphere at 60° C. After the constant voltage charging, the internal resistances of the non-aqueous electrolyte secondary batteries were measured. The results are also shown in Table 1 below.

TABLE 1

| | Conductive agent in negative electrode | | Negative electrode active material/ Positive electrode | Qo | Internal resistance |
|---|---|---|---|---|---|
| | Type | $C_0$(Å) | active material X | (mAh) | (Ω) |
| Ex. 1 | Vapor grown carbon fiber | 6.80 | 0.725 | 2.85 | 825 |
| Ex. 2 | Vapor grown carbon fiber | 6.80 | 0.690 | 2.78 | 176 |
| Ex. 3 | Vapor grown carbon fiber | 6.80 | 0.480 | 2.14 | 105 |
| Comp. Ex. 1 | Vapor grown carbon fiber | 6.80 | 0.790 | 3.01 | 5k or greater |
| Comp. Ex. 2 | Vapor grown carbon fiber | 6.80 | 0.440 | 1.75 | 96 |

The results demonstrate that the non-aqueous electrolyte secondary batteries of Examples 1 to 3, in which the mass ratio X of the negative electrode active material $MoO_2$ to the positive electrode active material $LiCoO_2$ was in the range of from 0.725 to 0.480, exhibited considerably lower internal resistances than the non-aqueous electrolyte secondary battery of Comparative Example 1, in which the mass ratio X was 0.790, and that the non-aqueous electrolyte secondary batteries of Examples 1 to 3 were capable of preventing the battery performance from degrading when they were charged for a long period of time at a constant voltage of 3.2 V. Although the non-aqueous electrolyte secondary battery of Comparative Example 2, in which the mass ratio X was 0.440, had a lower internal resistance, it showed a low initial discharge capacity Qo than the non-aqueous electrolyte secondary batteries of Examples 1 to 3, and it did not attain 2.0 mAh, which is necessary for use as a power source for memory backup.

EXAMPLES 4 TO 6 AND COMPARATIVE EXAMPLES 3 AND 4

In Examples 4 to 6 and Comparative Examples 3 and 4, non-aqueous electrolyte secondary batteries of Examples 4 to 6 and Comparative Examples 3 and 4 were fabricated in the same manner as in Example 1, except that, in preparing the negative electrode as in Example 1, the type of conductive agent used for the negative electrode was changed. In the non-aqueous electrolyte secondary batteries of Examples 4 to 6 and Comparative Examples 3 and 4 as well, the mass ratio X of the negative electrode active material $MoO_2$ to the positive electrode active material $LiCoO_2$ was 0.725.

The conductive agents in the negative electrodes were as follows. Example 4 used graphitized vapor grown carbon fiber in which $C_0=6.74$ Å, $L_a=900$ Å, and $L_c=200$ Å. Example 5 used natural graphite in which $C_0=6.71$ Å, $L_a=100$ Å, and $L_c=70$ Å. Example 6 used artificial graphite in which $C_0=6.72$ Å, $L_a=300$ Å, and $L_c=300$ Å. Comparative Example 3 used graphitized vapor grown carbon fiber in which $C_0=6.83$ Å, $L_a=700$ Å, and $L_c=150$ Å. Comparative Example 4 used carbon black in which $C_0=7.00$ Å, $L_a=100$ Å, and $L_c=360$ Å.

EXAMPLE 7

In Example 7, a non-aqueous electrolyte secondary battery of Example 7 was fabricated in the same manner as in Example 1 except for the following. In preparing the negative electrode as in Example 1 above, no conductive agent was added to the negative electrode. A negative electrode mixture was prepared by mixing 97 parts by mass of powder of $MoO_2$ and 3 parts by mass of polyvinylidene fluoride as a binder agent, and 16.22 mg of the negative electrode mixture thus prepared was pressure formed, to thus produce a negative electrode in a pellet form having a diameter of 4.16 mm and a thickness of 0.31 mm. In the non-aqueous electrolyte secondary battery of Example 7 as well, the amount of $MoO_2$ in the negative electrode was ~15.73 mg, and the mass ratio X of the negative electrode active material $MoO_2$ to the positive electrode active material $LiCoO_2$ was 0.725.

EXAMPLES 8 TO 10 AND COMPARATIVE EXAMPLES 5 AND 6

In Examples 8 to 10 and Comparative Examples 5 and 6, non-aqueous electrolyte secondary batteries of Examples 8 to 10 and Comparative Examples 5 and 6 were fabricated in the same manner as in Example 3 above so that the mass ratio X of the negative electrode active material $MoO_2$ to the positive electrode active material $LiCoO_2$ was 0.480, except that the types of conductive agents used for the negative electrodes were changed from that in the case of Example 3 above.

The conductive agents in the negative electrodes were as follows. Example 8 used graphitized vapor grown carbon fiber in which $C_0=6.74$ Å, $L_a=900$ Å, and $L_c=200$ Å, the same as that in Example 4. Example 9 used natural graphite in which $C_0=6.71$ Å, $L_a=100$ Å, and $L_c=70$ Å, the same as that in Example 5. Example 10 used artificial graphite in which $C_0=6.72$ Å, $L_a=300$ Å, and $L_c=300$ Å, the same as that in Example 6. Comparative Example 5 used graphitized vapor grown carbon fiber in which $C_0=6.83$ Å, $L_a=700$ Å, and $L_c=150$ Å, the same as that in Comparative Example 3. Comparative Example 6 used carbon black in which $C_0=7.00$ Å, $L_a=100$ Å, and $L_c=360$ Å, the same as that in Comparative Example 4.

EXAMPLE 11

In Example 11, no conductive agent was added to the negative electrode, as in the case of Example 7 above. A negative electrode mixture was prepared by mixing 97 parts by mass of powder of $MoO_2$ and 3 parts by mass of polyvinylidene fluoride as a binder agent, and 12.16 mg of the mixture thus prepared was pressure formed to prepare a negative electrode in a pellet form having a diameter of 4.16 mm and a thickness of 0.31 mm. A non-aqueous electrolyte secondary battery of Example 11 was fabricated as in Example 3 above so that the mass ratio X of the negative electrode active material $MoO_2$ to the positive electrode active material $LiCoO_2$ became 0.480.

The non-aqueous electrolyte secondary batteries of Examples 4 to 11 and Comparative Examples 3 to 6, fabricated in the above-described manner, were charged at a constant current of 50 μA at room temperature until the battery voltage reached 3.2 V, and thereafter, they were charged at a constant voltage of 3.2 V consecutively for 30 days in an atmosphere (air) at 60° C. After the constant voltage charging, the internal resistances of the non-aqueous electrolyte secondary batteries were measured. The results are shown in Table 2 below, along with the results for Examples 1 and 3.

TABLE 2

| | Conductive agent in negative electrode | | Negative electrode active material/ Positive electrode | Qo | Internal resistance |
|---|---|---|---|---|---|
| | Type | $C_0$(Å) | active material X | (mAh) | (Ω) |
| Ex. 1 | Vapor grown carbon fiber | 6.80 | 0.725 | 2.85 | 825 |
| Ex. 4 | Vapor grown carbon fiber | 6.74 | 0.725 | 2.85 | 725 |
| Ex. 5 | Natural graphite | 6.71 | 0.725 | 2.85 | 1848 |
| Ex. 6 | Artificial graphite | 6.72 | 0.725 | 2.85 | 2560 |
| Ex. 7 | — | — | 0.725 | 2.85 | 534 |
| Comp. Ex. 3 | Vapor grown carbon fiber | 6.83 | 0.725 | 2.85 | 4005 |
| Comp. Ex. 4 | Carbon black | 7.00 | 0.725 | 2.85 | 5k or greater |
| Ex. 3 | Vapor grown carbon fiber | 6.80 | 0.480 | 2.14 | 105 |
| Ex. 8 | Vapor grown carbon fiber | 6.74 | 0.480 | 2.14 | 98 |
| Ex. 9 | Natural graphite | 6.71 | 0.480 | 2.14 | 893 |
| Ex. 10 | Artificial graphite | 6.72 | 0.480 | 2.14 | 975 |
| Ex. 11 | — | — | 0.480 | 2.14 | 78 |
| Comp. Ex. 5 | Vapor grown carbon fiber | 6.83 | 0.480 | 2.14 | 3689 |
| Comp. Ex. 6 | Carbon black | 7.00 | 0.480 | 2.14 | 5k or greater |

The results demonstrate that the non-aqueous electrolyte secondary batteries of Examples 1, 3, 4 to 6, and 8 to 10, in which the conductive agents of the negative electrodes contained only the carbon materials having a lattice-constant $C_0$ of 6.8 Å or less, and the non-aqueous electrolyte secondary batteries of Examples 7 and 11, in which the negative electrodes contained no conductive agent, exhibited significantly lower internal resistances than the non-aqueous electrolyte secondary batteries of Comparative Examples 3 to 6, which used carbon materials having a lattice constant $C_0$ of greater than 6.8 Å. Thus, it is demonstrated that the non-aqueous electrolyte secondary batteries according to the invention were capable of preventing the battery performance from degrading when they were charged at a constant voltage of 3.2 V for a long period of time.

EXAMPLES 12 TO 15

In Examples 12 to 15, non-aqueous electrolyte secondary batteries of Example 12 to 15 were fabricated in the same manner as in Example 1 except that the negative electrode mixture used in preparing the negative electrode as in Example 1 above was changed. In each of the non-aqueous electrolyte secondary batteries of Examples 12 to 15 as well, the mass ratio X of the negative electrode active material $MoO_2$ to the positive electrode active material $LiCoO_2$ was 0.725.

Here, in preparing the negative electrode mixture in Example 12, the proportions of the components were as follows: 92 parts by mass negative electrode active material $MoO_2$; 2.5 parts by mass graphitized vapor grown carbon fiber ($C_0$=6.80 Å), the same one as that in Example 1; 2.5 parts by mass artificial graphite ($C_0$=6.72 Å), the same one as that in Example 6; and 3 parts by mass polyvinylidene fluoride (PVdF) as the binder agent.

In Example 13, the proportions of the components of the negative electrode mixture were as follows: 92 parts by mass negative electrode active material $MoO_2$; 2.5 parts by mass graphitized vapor grown carbon fiber ($C_0$=6.80 Å), the same one as that in Example 1; 2.5 parts by mass artificial graphite ($C_0$=6.72 Å), the same one as that in Example 6; and 3 parts by mass fluorinated ethylene propylene (FEP) as the binder agent.

In Example 14, the proportions of the components of the negative electrode mixture were as follows: 92 parts by mass negative electrode active material $MoO_2$; 2.5 parts by mass graphitized vapor grown carbon fiber ($C_0$=6.80 Å), the same one as that in Example 1; 2.5 parts by mass artificial graphite ($C_0$=6.72 Å), the same one as that in Example 6; and 3 parts by mass polyimide (PI) as the binder agent.

In Example 15, no conductive agent was added to the negative electrode, as in the case of Example 7 above, and the proportions of the components of the negative electrode mixture were: 97 parts by mass negative electrode active material $MoO_2$; and 3 parts by mass polyimide (PI) as the binder agent.

Then, as in the case of the non-aqueous electrolyte secondary battery of Example 1 above, the non-aqueous electrolyte secondary batteries of Examples 12 to 15 prepared in the above-described manner were charged at a constant current of 50 μA until the battery voltage reached 3.2 V, and thereafter subjected to initial charging at a constant voltage of 3.2 V until the current lowered to 5 μA. Thereafter, the batteries were discharged at a current of 50 μA until the battery voltage became 2.0 V, and the initial discharge capacity Qo of each of the batteries was measured.

Subsequently, the non-aqueous electrolyte secondary battery of Examples 12 to 15 as well as Example 1 were charged at a constant current of 50 μA until the battery voltage reached 3.2 V, and thereafter charged consecutively for 30 days at a constant voltage of 3.2 V in an atmosphere (air) at 60° C. Thereafter, the batteries were discharged until the battery voltage reached 2.0 V, and the discharge capacity Qa after the test was measured for each of the batteries. Then, with each of the batteries, the percentage of capacity retention was found according to the following equation. The results are shown in Table 3 below.

Percentage of capacity retention=$(Qa/Qo) \times 100$.

TABLE 3

| | Composition of negative electrode mixture | | | | |
|---|---|---|---|---|---|
| | | Vapor grown carbon fiber $C_0$ = 6.80 Å | Artificial graphite $C_0$ = 6.72 Å | Binder agent | X | Percentage of capacity retention (%) |
| | $MoO_2$ | | | | | |
| Ex. 1 | 92 | 5 | — | 3 (PVdF) | 0.725 | 34 |
| Ex. 12 | 92 | 2.5 | 2.5 | 3 (PVdF) | 0.725 | 59 |
| Ex. 13 | 92 | 2.5 | 2.5 | 3 (FEP) | 0.725 | 65 |
| Ex. 14 | 92 | 2.5 | 2.5 | 3 (PI) | 0.725 | 79 |
| Ex. 15 | 97 | — | — | 3 (PI) | 0.725 | 87 |

The results demonstrate that the non-aqueous electrolyte secondary batteries of Examples 12 to 14, in each of which the conductive agents of the negative electrode were graphitized vapor grown carbon fiber having a lattice constant $C_0$ of 6.8 Å or less and, in addition to the graphitized vapor grown carbon fiber, artificial graphite having a lattice constant $C_0$ of 6.8 Å or less exhibited higher percentages of capacity retention than the non-aqueous electrolyte secondary battery of Example 1, which utilized only the graphitized vapor grown carbon fiber having a lattice constant $C_0$ of 6.8 Å as the conductive agent of the negative electrode. This means that the non-aqueous electrolyte secondary batteries of Examples 12 to 14 achieved improved cycle life when they are continuously charged for a long period of time while being kept at a constant voltage. Particularly, the non-aqueous electrolyte secondary battery of Example 14, which utilized polyimide (PI) as the binder agent, achieved a high percentage of capacity retention. Moreover, the non-aqueous electrolyte secondary battery of Example 15, which used no conductive agent in the negative electrode and utilized polyimide (PI) as the binder agent, exhibited a further higher percentage of capacity retention, which means that it achieved further improved cycle life in the case that the battery is continuously charged for a long period of time while being kept at a constant voltage.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese patent application No. 2005-083202 filed Mar. 23, 2005, which is incorporated herein by reference.

What is claimed is:

1. A non-aqueous electrolyte secondary battery comprising:
    a positive electrode containing lithium cobalt oxide as a positive electrode active material;

a negative electrode containing a conductive agent and molybdenum dioxide as a negative electrode active material; and a non-aqueous electrolyte wherein the mass ratio of the negative electrode active material to the positive electrode active material is within the range of from 0.725 to 0.480;

the conductive agent of the negative electrode consists of a carbon material having a lattice constant $C_0$ along a stacking direction of from 6.7 Å to 6.8 Å, as determined by X-ray diffraction, the carbon material being a mixture of graphitized vapor grown carbon fiber having a ratio (La/Lc) of the crystallite size La along the a-axis to the crystallite size Lc along the c-axis of from 4 to 6 and an artificial graphite having the ratio La/Lc of about 1.

2. The non-aqueous electrolyte secondary battery according to claim 1, wherein the binder agent of the negative electrode is polyimide.

* * * * *